United States Patent
Sweet et al.

(10) Patent No.: US 8,610,928 B2
(45) Date of Patent: Dec. 17, 2013

(54) FRAMEWORK THAT SUPPORTS DRIVERLESS PRINTING

(75) Inventors: Michael R. Sweet, Morgan Hill, CA (US); Howard A. Miller, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 12/882,116

(22) Filed: Sep. 14, 2010

(65) Prior Publication Data

US 2011/0194141 A1    Aug. 11, 2011

Related U.S. Application Data

(60) Provisional application No. 61/302,916, filed on Feb. 9, 2010, provisional application No. 61/351,461, filed on Jun. 4, 2010, provisional application No. 61/378,832, filed on Aug. 31, 2010, provisional application No. 61/302,922, filed on Feb. 9, 2010, provisional application No. 61/351,466, filed on Jun. 4, 2010, provisional application No. 61/358,306, filed on Jun. 24, 2010, provisional application No. 61/378,827, filed on Aug. 31, 2010.

(51) Int. Cl.
  *G06K 15/02* (2006.01)
  *G06F 3/12* (2006.01)
  *G06K 15/00* (2006.01)

(52) U.S. Cl.
  USPC ........... 358/1.15; 358/1.2; 358/2.1; 358/1.13; 358/1.16

(58) Field of Classification Search
  None
  See application file for complete search history.

(56) References Cited

U.S. PATENT DOCUMENTS

| | | | |
|---|---|---|---|
| 5,287,194 | A | 2/1994 | Lobiondo |
| 5,768,483 | A | 6/1998 | Maniwa |
| 6,268,927 | B1 | 7/2001 | Lo |
| 6,549,654 | B1 | 4/2003 | Kumada |
| 2002/0078149 | A1 | 6/2002 | Chang |
| 2002/0138564 | A1 | 9/2002 | Treptow |
| 2003/0063309 | A1 | 4/2003 | Parry |

(Continued)

FOREIGN PATENT DOCUMENTS

| | | | |
|---|---|---|---|
| CN | 1217503 | A | 5/1999 |
| CN | 1525305 | A | 9/2004 |

(Continued)

OTHER PUBLICATIONS

International Search Report and Written Opinion for PCT Application No. PCT/US2011/023474, Dated Mar. 25, 2011, 7 pages.

(Continued)

*Primary Examiner* — Benny Q Tieu
*Assistant Examiner* — Haris Sabah
(74) *Attorney, Agent, or Firm* — Wong, Cabello, Lutsch, Rutherford & Brucculeri, LLP

(57) ABSTRACT

The disclosed embodiments provide a system that facilitates driverless printing. This system includes a discovery component configured to identify accessible printers and to facilitate selection of an accessible printer, wherein the discovery component is also configured to obtain capability information from accessible printers. The system also includes a transport component configured to transport data to the selected printer, wherein the transport component is also configured to obtain capability information from the selected printer. Finally, the system includes a page-description-language component configured to generate printer data for the selected printer based on obtained capability information for the selected printer.

24 Claims, 9 Drawing Sheets

(56) References Cited

U.S. PATENT DOCUMENTS

| | | | |
|---|---|---|---|
| 2004/0239986 A1 | 12/2004 | Wise | |
| 2005/0046886 A1 | 3/2005 | Ferlitsch | |
| 2005/0050013 A1* | 3/2005 | Ferlitsch | 707/3 |
| 2007/0127063 A1 | 6/2007 | Fertlitsch | |
| 2007/0177192 A1* | 8/2007 | Wang | 358/1.15 |
| 2007/0182993 A1 | 8/2007 | Yamada | |
| 2008/0112013 A1* | 5/2008 | Ferlitsch et al. | 358/3.28 |
| 2008/0180699 A1 | 7/2008 | Selvaraj | |
| 2009/0059272 A1 | 3/2009 | Matsushita | |
| 2011/0194123 A1 | 8/2011 | Sweet | |
| 2011/0194124 A1 | 8/2011 | Sweet | |
| 2011/0194140 A1 | 8/2011 | Sweet | |
| 2011/0194141 A1 | 8/2011 | Sweet | |

FOREIGN PATENT DOCUMENTS

| | | | |
|---|---|---|---|
| CN | 1537298 A | 10/2004 | |
| EP | 1450515 A2 | 8/2004 | |
| EP | 1818805 A2 | 8/2007 | |
| EP | 1953642 A2 | 8/2008 | |
| EP | 1973031 A1 | 9/2008 | |
| JP | 11053142 A | 2/1999 | |
| WO | 2011100148 A1 | 8/2011 | |

OTHER PUBLICATIONS

Cheshire, S. et al., "DNS-Based Service Discovery", The Internet Society, Feb. 14, 2004, 32 pages.
Cheshire, S. et al., "Dynamic Configuration of IPv4 Link-Local Addresses", The Internet Society, May 2005, 33 pages.
Wright, F.D., "Design Goals for an Internet Protocol", The Internet Society, Apr. 1999, 86 pages.
"Bonjour Printing Specification", Apple Computer, Inc., Apr. 12, 2005, 24 pages.
Zilles, Stephen, "Rationale for the Structure of the Model and Protocol for the Internet Printing Protocol", The Internet Society, Apr. 1999, 10 pages.
Hastings, T. et al., "Internet Printing Protocol/1.0: Implementer's Guide", The Internet Society, Jul. 1999, 65 pages.
First Office Action received in corresponding CN Application No. 201110034714.0, dated May 24, 2013.
International Search Report and Written Opinion received in corresponding PCT Application No. PCT/US2013/024006 dated Apr. 25, 2013.
First Office Action received in corresponding CN Application No. 201110034596.3 dated Apr. 2, 2013 with translation.
International Search Report and Written Opinion received in corresponding PCT Application No. PCT/US2013/024031 dated Apr. 17, 2013.
Search Report and Written Opinion received in corresponding PCT Application No. PCT/US2011/023475, dated Mar. 25, 2011.

\* cited by examiner

URF-SUPPORTED KEY
600

| |
|---|
| COLOR SPACES |
| BIT DEPTHS |
| MAX COPIES |
| DUPLEX SUPPORT |
| FINISHINGS |
| INPUT SLOTS |
| INPUT ORIENTATION |
| MEDIA TYPES |
| OUTPUT BINS |
| OUTPUT ORIENTATION |
| PRINT QUALITIES |
| RESOLUTIONS |

FIG. 6

FRAMEWORK THAT SUPPORTS DRIVERLESS PRINTING

RELATED APPLICATIONS

This application claims priority under 35 U.S.C. §119 to U.S. Provisional Patent Application No. 61/302,916 filed 9 Feb. 2010, entitled "Walk-Up Printing without Drivers" by the same inventors as the instant application. This application also claims priority under 35 U.S.C. §119 to U.S. Provisional Patent Application No. 61/351,461 filed 4 Jun. 2010, entitled "Walk-Up Printing without Drivers" by the same inventors as the instant application. This application also claims priority under 35 U.S.C. §119 to U.S. Provisional Patent Application No. 61/378,832 filed 31 Aug. 2010, entitled "Walk-Up Printing without Drivers" by the same inventors as the instant application. This application also claims priority under 35 U.S.C. §119 to U.S. Provisional Patent Application No. 61/302,922 filed 9 Feb. 2010, entitled "Framework that Supports Driverless Printing" by the same inventors as the instant. This application also claims priority under 35 U.S.C. §119 to U.S. Provisional Patent Application No. 61/351,466 filed 4 Jun. 2010, entitled "Framework that Supports Driverless Printing" by the same inventors as the instant application. This application also claims priority under 35 U.S.C. §119 to U.S. Provisional Patent Application No. 61/358,306 filed 24 Jun. 2010, entitled "Framework that Supports Driverless Printing" by the same inventors as the instant application. This application also claims priority under 35 U.S.C. §119 to U.S. Provisional Patent Application No. 61/378,827 filed 31 Aug. 2010, entitled "Framework that Supports Driverless Printing" by the same inventors as the instant application.

This application is related to pending U.S. patent application Ser. No. 12/882,107, filed on the same day as the instant application, entitled "Walk-Up Printing without Drivers" by the same inventors as the instant application. This application is also related to pending U.S. patent application Ser. No. 12/882,124, filed on the same day as the instant application, entitled "Printer that Supports Driverless Printing" by the same inventors as the instant application. This application is also related to pending U.S. patent application Ser. No. 12/882,134 filed on the same day as the instant application, entitled "Data Formats to Support Driverless Printing" by the same inventors as the instant application.

BACKGROUND

1. Field

The disclosed embodiments relate to printers for computer systems. More specifically, the disclosed embodiments relate to a computer-based printing system that operates without having to manage printer-specific driver software.

2. Related Art

Printers are often a problem for computer users. When a computer user initially installs a printer, the cabling and power cords are typically not a problem to hook up. However, the user typically has to install a printer-specific driver, which involves loading the driver from a disk or navigating to a website and downloading the driver. Even if the printer driver is already loaded into the computer system, the user often has to load and install an update for the driver from the printer manufacturer's website. These installation operations are time-consuming and commonly require the user to find and enter a long software-license key.

Hence, what is needed is a system that facilitates installing a printer without the above-described problems.

SUMMARY

The disclosed embodiments provide a system that facilitates driverless printing. This system includes a discovery component configured to identify accessible printers and to facilitate selection of an accessible printer, wherein the discovery component is also configured to obtain capability information from accessible printers. The system also includes a transport component configured to transport data to the selected printer, wherein the transport component is also configured to obtain capability information from the selected printer. Finally, the system includes a page-description-language component configured to generate printer data for the selected printer based on obtained capability information for the selected printer.

In some embodiments, the system provides an integrated framework that enables the discovery component, the transport component and the page-description-language component to be accessed by an application.

In some embodiments, the integrated framework includes one or more application programming interfaces (APIs) that provide access to the discovery component, the transport component and/or the page-description-language component. These APIs enable a calling application to interact with other application code being called through the API. Various function calls, messages or other types of invocations, which further may include various kinds of parameters, can be transferred via the API between the calling application and the code being called. In addition, the API may provide the calling application code the ability to use data types or classes defined in the API and implemented in the called application code. A method for operating through this API includes transferring one or more function calls, messages, other types of invocations or parameters via the API.

In some embodiments, while obtaining the capability information from accessible printers, the discovery component is configured to obtain current status information from the accessible printers.

In some embodiments, the current status information can specify: whether the printer is off-line; whether the printer is busy; or whether an error condition exists in the printer.

In some embodiments, the capability information for a printer can specify, for example, the file sizes supported by the printer; the file-format versions supported by the printer; the file-format extensions supported by the printer; the color spaces supported by the printer; the bit depths supported by the printer; or the resolutions supported by the printer.

In some embodiments, the capability information obtained from the selected printer enables the system to generate printer data for the selected printer without the need for the system to maintain printer-specific software or printer-specific configuration information for the selected printer.

Some embodiments include one or more application programming interfaces (APIs) in an environment with calling program code that interacts with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined within the API and implemented in the called program code.

At least certain embodiments include an environment with a calling software component interacting with a called software component through an API. A method for operating through an API in this environment includes transferring one or more function calls, messages, and other types of invocations or parameters via the API.

BRIEF DESCRIPTION OF THE FIGURES

FIG. 6 illustrates the structure of a universal-raster-format-supported (URF-supported) key in accordance with the disclosed embodiments.

DETAILED DESCRIPTION

Figure 1:
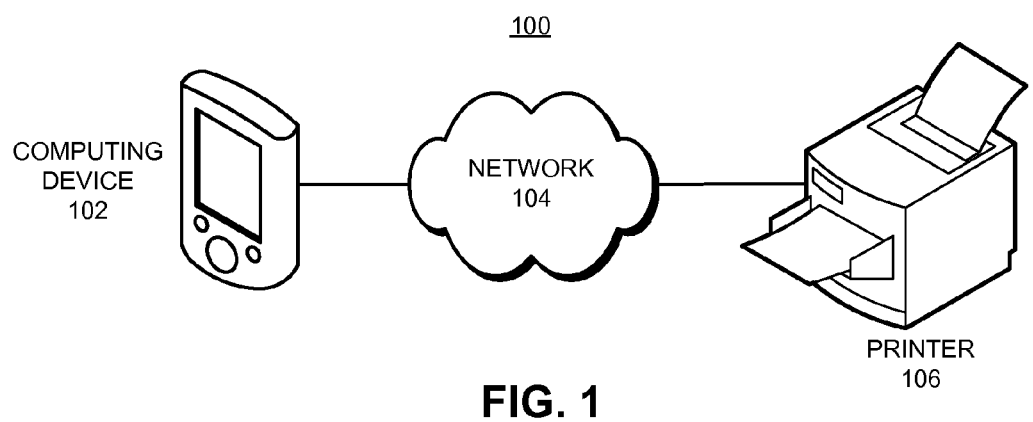
FIG. 1 illustrates a printing system in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Driverless Printing

The disclosed embodiments facilitate "driverless printing," which enables a computing device to print to a printer without having to worry about installing or updating associated printer driver software. This is accomplished by augmenting a discovery protocol (such as Bonjour™) and an associated network-printing protocol (such as IPP), so that the protocols return printer capability information which is used to generate printer data for a selected printer.

Note that the disclosed embodiments differ from existing systems which need to maintain specific drivers for each supported printer. In these existing systems, the features and capabilities for specific printers are stored in static capability files created by the printer vendors, such as a PostScript Printer Description (PPD) file, and these static capability files are stored on the mobile device itself. In contrast, the disclosed embodiments query a printer (not a static file) to determine the "current" operational capabilities of a printer. In addition to the discovery protocol and the network-printing protocol, the disclosed embodiments also provide a page-description language that specifies the appearance of printed pages.

The disclosed embodiments additionally provide a framework which enables an application to easily use the discovery protocol, the network-printing protocol and the page-description language. This framework can be implemented using one or more APIs which enable an application to access these components. Details of the disclosed embodiments are described below, but first we describe the printing system.

Printing System

FIG. 1 illustrates a printing system 100 in accordance with the disclosed embodiments. Printing system 100 includes a computing device 102 and a printer 106. Computing device 102 can generally include any type of computer system or computing device, such as a personal computer system, a server computer system, a laptop computer, a notebook computer, a tablet computer, a personal digital assistant, a digital media receiver (such as Apple TV™), a digital picture frame, a cellular telephone or a portable navigation system. Printer 106 can generally include any device or system capable of printing textual data or images onto some type of print media, such as paper or photo media. For example, printer 106 can comprise a stand-alone printer, or alternatively a printing system, which includes a print server that is coupled to one or more printers.

Computing device 102 is coupled to printer 106 through network 104. Network 104 can generally include any type of communication channel capable of coupling together network nodes. For example, network 104 can include a wireless network connection, such as a Bluetooth™ network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology. Network 104 can also include a wired network connection, such as a network connection based on the standards described in IEEE 802.3.

During the printing process, computing device 102 initially makes contact with printer 106 through a discovery protocol as is described in more detail below. Next, after printer 106 is identified and selected, there are a number of ways that printing can be accomplished. If computing device 102 possesses a driver for printer 106, or if printer 106 supports driverless printing, computing device 102 can use the driver or the driverless printing protocol to generate printer data for a print job. The printer data can then be sent to printer 106 through network 104. This process is described in more detail below. (Note that the term "driverless printing" refers to a printing technique which operates without the need for printer-specific software or printer-specific configuration on a computing device.)

Printing Components

Figure 2:
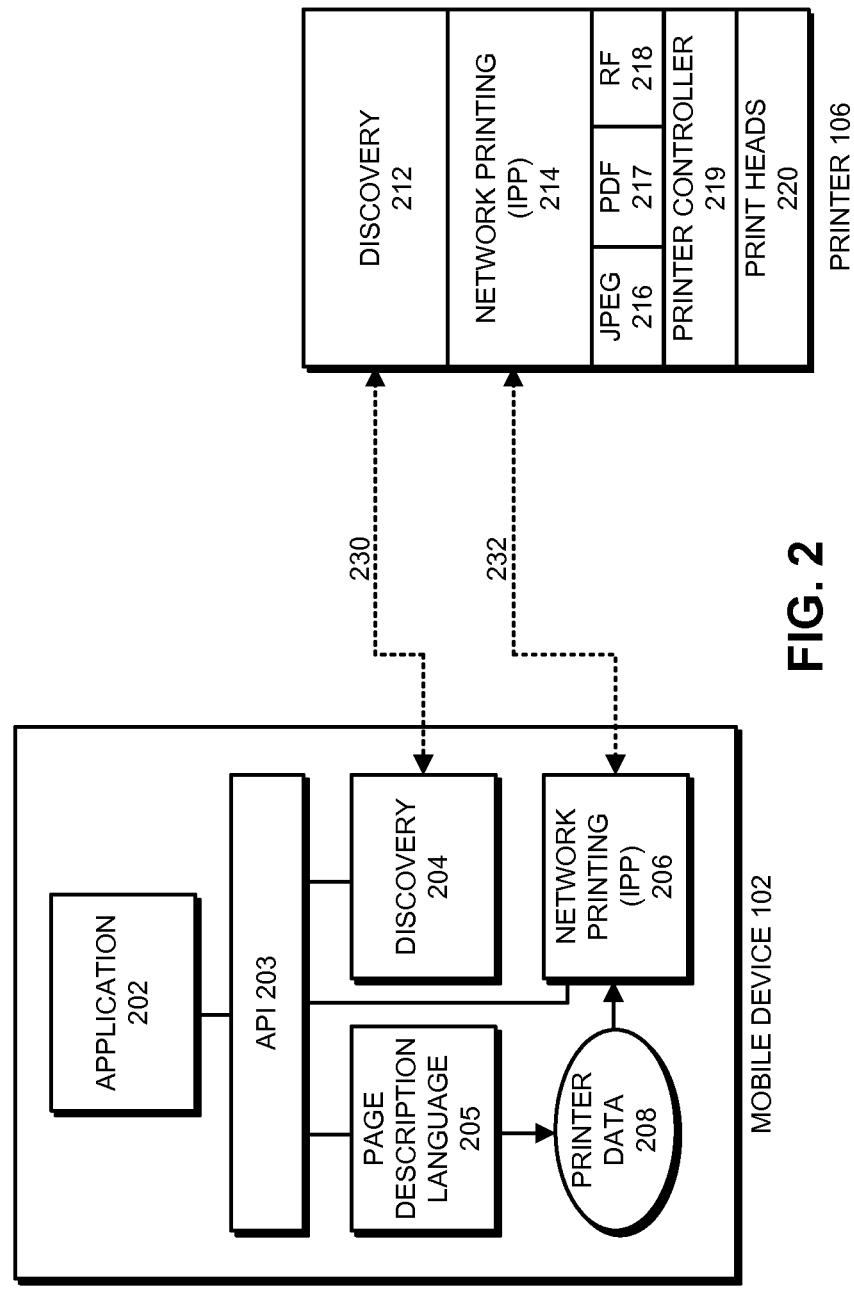
FIG. 2 illustrates components involved in performing a printing operation in accordance with the disclosed embodiments.

FIG. 2 illustrates components involved in performing a printing operation in accordance with the disclosed embodiments. Referring to FIG. 2, computing device 102 includes an application 202 which needs to perform a printing operation. For example, application 202 can include a printing utility that allows a user to print a specific file. Alternatively, application 202 can include any type of general-purpose or special-purpose computer-based application that periodically needs to perform a printing operation, such as a word processor. Application 202 makes calls to API 203, which provides a framework that facilitates access to a number of components, including a discovery component 204, a page-description-language component 205 and a network-printing component 206.

During operation, application 202 uses discovery component 204, which implements a discovery protocol (such as Bonjour™) to identify available printers and to facilitate selecting one of the identified printers. Note that discovery component 204 communicates with a corresponding discovery component 212 in printer 106 (illustrated by dashed line 230). Next, after a printer 106 is selected, application 202 uses page-description-language component 205 to render a print job to produce corresponding printer data 208. Printer data 208 is then sent to network-printing component 206, which implements a network protocol for remote printing, such as an Internet Printing Protocol (IPP). Network-printing component 206 communicates printer data 208 to a corresponding network-printing component 214 within printer 106 (illustrated by dashed line 232).

As mentioned above, printer 106 contains a discovery component 212 and a network-printing component 214. In addition, printer 106 includes components that support printing using, for example, the JPEG (Joint Photographic Experts Group) standard 216, the PDF (Portable Document Format) standard 217, and a RF (Raster Format) standard 218. These components send data through print controller 219 to print heads 220 within printer 106, so that print controller 219 can translate the data and print heads 220 can print the translated data onto some type of print media, such as paper.

Printing Process

Figure 3:
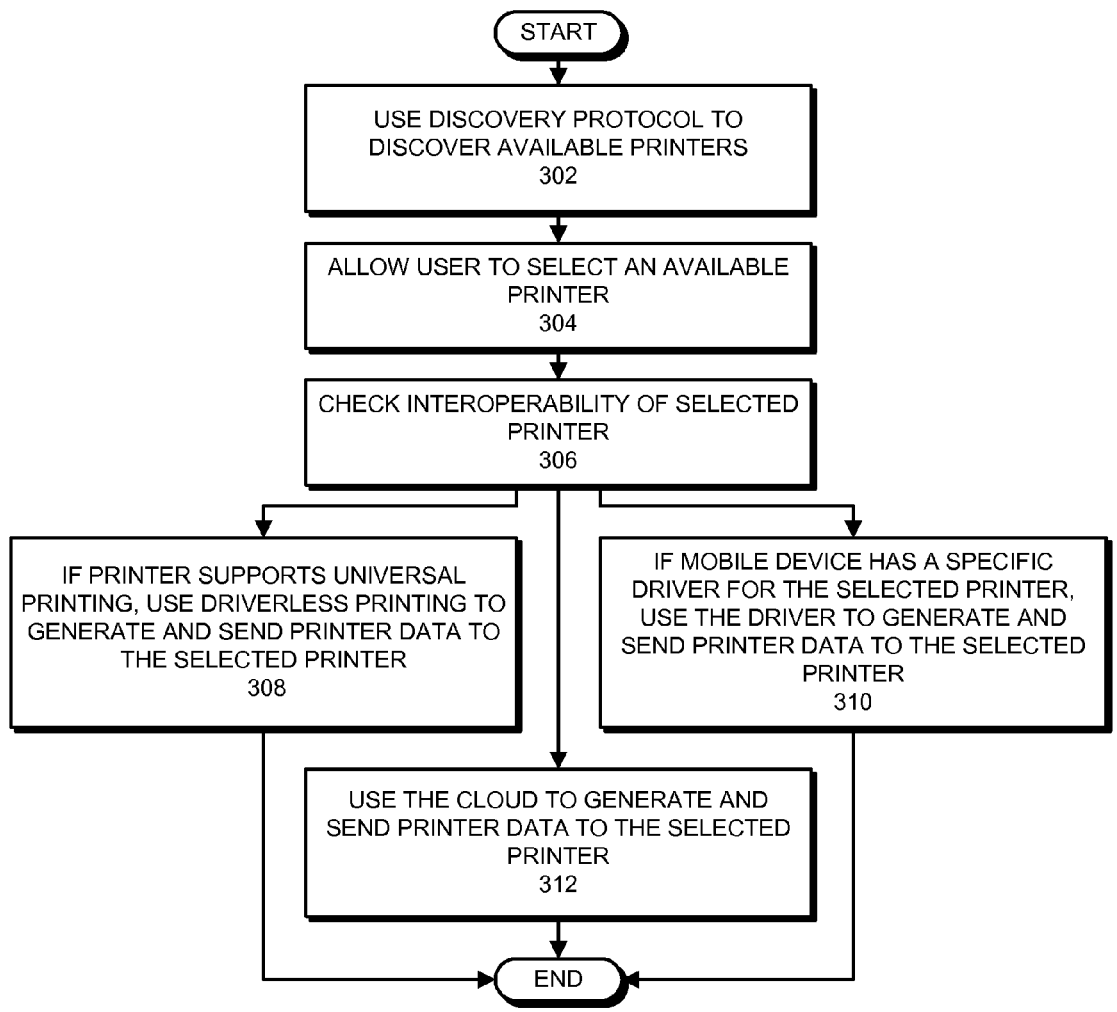
FIG. 3 presents a flow chart illustrating the printing process in accordance with the disclosed embodiments.

FIG. 3 presents a flow chart illustrating the printing process in accordance with the disclosed embodiments. First, the system uses a discovery protocol, such as the Bonjour™ protocol, to identify printers that can be accessed by computing device 102 (step 302). As mentioned above, this discovery protocol also obtains capability information from the printer. Next, the system presents a list of available printers to a user (or an application) and allows the user (or the application) to select one of the identified printers (step 304).

Next, the system checks interoperability of the selected printer (step 306). For example, the system can obtain information from the printer indicating that the printer supports JPEG, PDF and RF, in which case the system can use any of the supported formats. On the other hand, if the information indicates the printer can only support RF, the system uses RF to send data to the printer.

Next, the system has a number of options. If the selected printer supports driverless printing, the system can obtain printer capability information from the selected printer and can generate printer data for the printer based on the obtained printer capability information. Next, the system can send the generated printer data to the selected printer (step 308). As mentioned above, this capability information can be obtained from the selected printer during a query for the discovery protocol, or during a subsequent network-printing protocol query. On the other hand, if the mobile device contains a specific driver for the selected printer, the system can use the specific driver to generate and send printer data to the selected printer (step 310). The system can alternatively send the print job to a cloud comprising one or more servers that provide a printing service. This enables the cloud to generate the printer data for the selected printer (step 312).

In general, the system can select among driverless printing, cloud printing and using a local driver based on a number of factors, such as power consumption and/or computational load. In one embodiment, the system uses driverless printing if possible, and if driverless printing is not supported, the system uses a local driver for the printer. Finally, if such a local driver is not supported, the system uses the cloud to generate the printer data.

Printer Capability Information

As mentioned above, the printer capability information can be obtained from the selected printer during a query for the discovery protocol (Bonjour™), or during a subsequent network-printing protocol (IPP) query. More specifically, during the discovery protocol, the selected printer can return printer-specific information specifying what types of data the selected printer can accept and information specifying the selected printer's capabilities. Moreover, this printer-specific information enables the computer device to generate the printer data for the selected printer without the need for the computer to maintain printer-specific software or printer-specific configuration information for the selected printer. Once the mobile device is actually communicating with the printer through IPP, the IPP protocol can provide the same printer-specific information. (This prevents having to cache information between the discovery protocol and the network-printing protocol.)

This printer capability information can specify attributes of the print media, such as media sizes, types (e.g., paper or photo media) and margins. This printer capability information can also specify finishing attributes, such as attributes related to stapling, hole punching and booklets. The printer capability information can additionally specify information related to printer features, such as whether it can print on two sides of a page (duplex), which output bit to use, and which media source (tray) to use. The printer capability attributes can also specify file-related attributes, such as the file sizes supported by the printer, the file-format versions supported by the printer, and the file-format extensions supported by the printer. The printer capability information can also specify various printer capabilities, such as the color spaces supported by the printer, the bit depths supported by the printer, and the resolutions supported by the printer.

This printer capability information can additionally specify current status information obtained from printers. For example, this current status information can specify: whether the printer is off-line; whether the printer is busy; or whether an error condition exists in the printer. This current status information can be presented to the user while the user is selecting an available printer.

Driverless Printing

Figure 4:
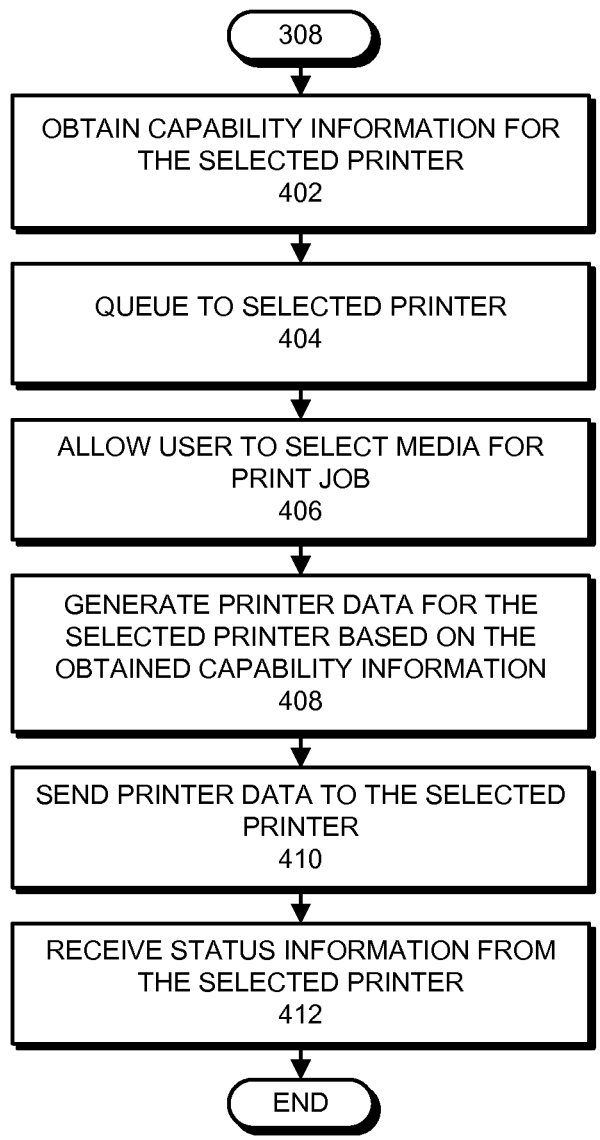
FIG. 4 presents a flow chart illustrating the driverless printing process in accordance with the disclosed embodiments.

FIG. 4 presents a flow chart illustrating the driverless printing process in accordance with the disclosed embodiments. (This flow chart illustrates some of the operations which take place during the driverless printing process which occurs in step 308 of FIG. 3.) First, the system obtains capability information for the selected printer (step 402). As mentioned above, this capability information can be obtained from the printer during a query which is part of the initial discovery protocol, or during a subsequent IPP query. Next, the system queues to the selected printer (step 404) and allows a user (or an application) to select a specific type of media for the print job (step 406).

The system then generates printer data for the selected printer based on the obtained capability information (step 408). Next, the printer sends the printer data to the selected printer (step 410). Finally, the system receives status information for the selected printer, which indicates whether the printer data was successfully printed (step 412).

Printing Process on the Printer Side

Figure 5:
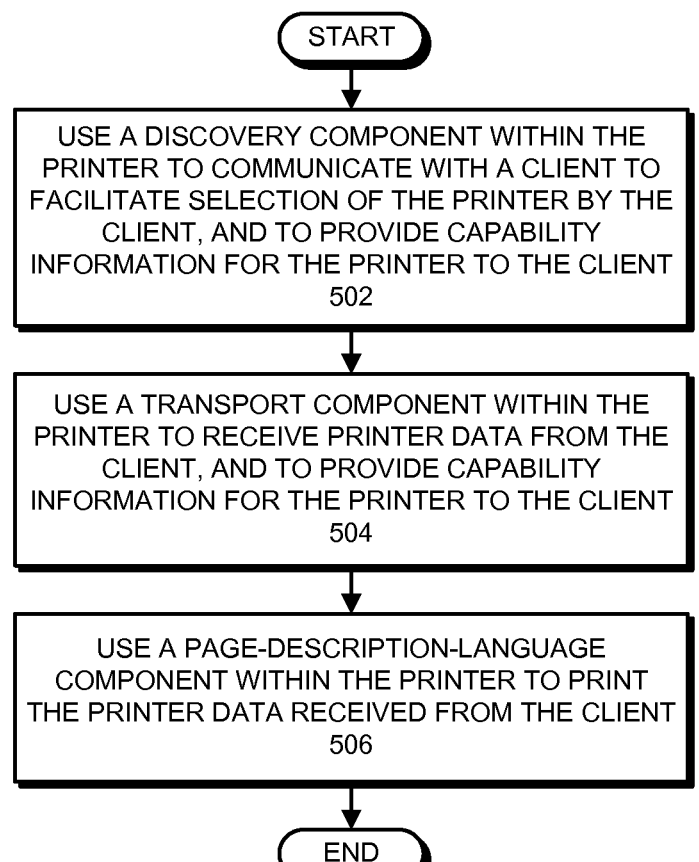
FIG. 5 presents a flow chart illustrating the printing process from the printer's perspective in accordance with the disclosed embodiments.

FIG. 5 presents a flow chart illustrating the printing process from the printer's perspective in accordance with the disclosed embodiments. First, the printer uses a discovery component within the printer to communicate with a client to facilitate selection of the printer by the client. During this discovery process, the discovery component can provide capability information for the printer to the client (step 502). Next, the printer uses a transport component within the printer to receive printer data from the client. During this process, the transport component can also provide capability information for the printer to the client (step 504). Finally, the printer can use a page-description-language component within the printer to print the printer data received from the client (step 506).

Document Format Preferred

To facilitate driverless printing, some of the disclosed embodiments have added new keys to the Internet Printing Protocol (IPP) standard. In particular, some embodiments include a new document-format-preferred key (as a MIME media type), which enables the printer to specify a "preferred" document format out of all of the document formats that are supported by the printer. This preferred document format can be used to improve performance. For example, the preferred document format may be more efficient to print than other document formats supported by the printer.

Note that the IPP standard already provides a document-format-supported key which specifies that a specific document format is supported by a printer. However, the existing IPP standard does not provide any way to indicate which of the supported document formats is preferred.

URF-Supported Key

Some embodiments have also added a new "URF-supported key" to a discovery protocol and a transport protocol. More specifically, some embodiments have added a new URF-supported key to the discovery protocol as part of a Bonjour™ TXT record, and have also added an analogous URF-supported key to the transport protocol as a new printer description attribute for the IPP protocol.

This URF-supported key specifies a standardized set of capabilities that are supported by a printer which enables a client to generate printer data for the client without the need for the client to maintain printer-specific software or printer-specific configuration information for the selected printer. This standardized set of capabilities is selected to enable the client to generate printer data for any type of printer.

In one embodiment, the standardized set of capabilities includes the following which also appear in the diagram of the URF-supported key 600 in FIG. 6,
 (1) color spaces that are supported by the printer;
 (2) bit depths that are supported by the printer for specific color spaces;
 (3) a maximum number of copies supported by the printer;
 (4) whether duplex printing is supported by the printer;
 (5) specific finishings that are supported by the printer (e.g., stapling, folding, hole punching);
 (6) input slots supported by the printer;
 (7) face-up/face-down input orientation;
 (8) media types supported by the printer (e.g., plain paper, glossy);
 (9) output bins supported by the printer;
 (10) face-up/face-down output orientation;
 (11) supported print qualities; and
 (12) supported resolutions.
In additional embodiments, the URF-supported key can include a subset of these capabilities.

Device-Independent Bitmap Container

Some embodiments support a new device-independent bitmap container for printer data. For example, the device-independent bitmap container can be implemented as a Multipurpose Internet Mail Extensions (MIME) subtype.

Figure 7:
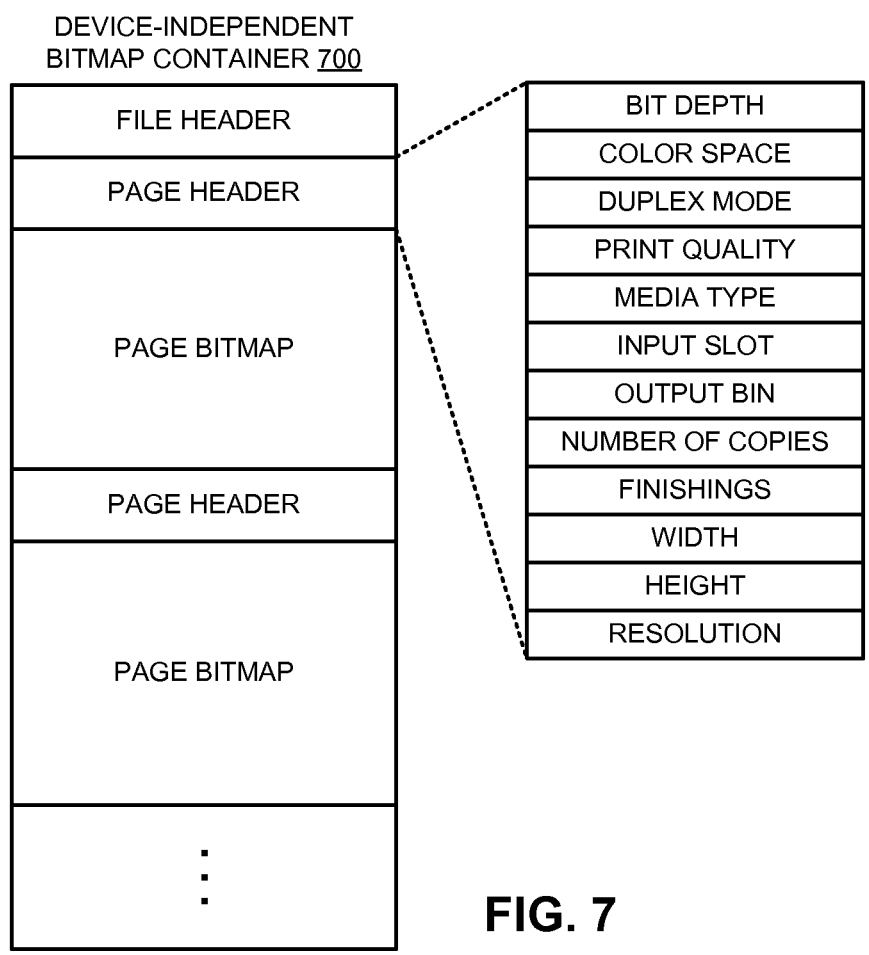
FIG. 7 illustrates the structure of a device-independent bitmap container in accordance with the disclosed embodiments.

This new device-independent bitmap container includes a file header, and at least one set of a page header and a page bitmap. In one embodiment, the page header can have a pre-determined format that specifies the following attributes for a page to be printed by a printer. (These attributes also appear in the device-independent bitmap container 700 which is illustrated in FIG. 7.)
 (1) a bit depth;
 (2) a color space;
 (3) a duplex mode;
 (4) a print quality;
 (5) a media type;
 (6) an input slot;
 (7) an output bin;
 (8) a number of copies;
 (9) one or more finishings;
 (10) a width;
 (11) a height; and
 (12) a resolution.
In alternative embodiments, the page header can have a pre-determined format that specifies a subset of these attributes.

Optimizations

In some embodiments, the system can perform optimizations to improve speed, increase print quality and save battery power. This can be accomplished by selecting a file type for the printer data that reduces the number of computational operations involved in generating the printer data, thereby improving speed and reducing the amount of power consumed by the computing device. For example, if a printer supports PDF and the computing device is printing a PDF file, it uses much less battery power and is faster to send the PDF file to the printer instead of converting the PDF file into raster data and sending the raster data to the printer. (Note that, by saving computational operations and computational time, the system frees up resources and time to perform other operations, for example to increase print quality.) Also, in the case where the cloud returns the generated printer data to the computing device, the system can select a file format which reduces the size of the printer data file. This reduces the number of data transfer operations required to forward the printer data to the printer, and thereby improves speed and reduces the amount of power consumed by the computing device.

In another example, the system can save power by selecting between driverless printing and cloud printing based on whether or not the power consumed while transferring data to and from the cloud will be offset by the power saved by off-loading the printer-related rendering operations to the cloud. By using a cloud, power-consuming computational operations can be off-loaded from a mobile device (that runs on battery power) to a server within a cloud (that runs on wall power), which can potentially save a significant amount of battery power.

Defect Solutions

In some cases, a printer manufacturer may attempt to implement a printer which adheres to the driverless printer specification, but the implementation may have one or more bugs. In this case, the system can maintain a database containing such known bugs for specific printer models. During a printing operation, the system can first perform a lookup in the database, and if one or more known bugs exist for a printer, the system can adjust how the printer data is generated to compensate for these known bugs.

Application Programming Interfaces

One or more Application Programming Interfaces (APIs) may be used in some embodiments. An API is an interface implemented by a program code component (hereinafter "API-implementing component") that allows a different program code component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third-party developer) to leverage specified features provided by an API-implementing component. There may be one API-calling component, or there may be more than one such component. An API can be a source code interface that a computer system or program library provides in order to support requests for services from an application. An API can be specified in terms of a programming language that can be interpreted or compiled when an application is built.

In some embodiments the API-implementing component may provide more than one API, each providing a different view of or that access different aspects of the functionality implemented by the API-implementing component. In other embodiments the API-implementing component may itself call one or more other components via an underlying API, and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied, for example, by function or method calls) exposed by the API, and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component, or to initiate performance of an operation or computation provided by the API-implementing component. By way of example, the API-implementing component and the API-calling component may be an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework.

In these embodiments the application or client program may incorporate calls to functions or methods provided by the SDK and provided by the API, or use data types or objects defined in the SDK and provided by the API. An application framework may in these embodiments provide a main event loop for a program that responds to various events defined by the framework. The API allows the application to specify the events and the responses to the events using the application framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component), and an API-calling component may also act as an API-implementing component by implementing an API that is exposed to a different API-calling component.

The API may allow multiple API-calling components written in different programming languages to communicate with the API-implementing component (thus, the API may include features for translating calls and returns between the API-implementing component and the API-calling component);

however, the API may be also implemented in terms of a specific programming language.

Figure 8:
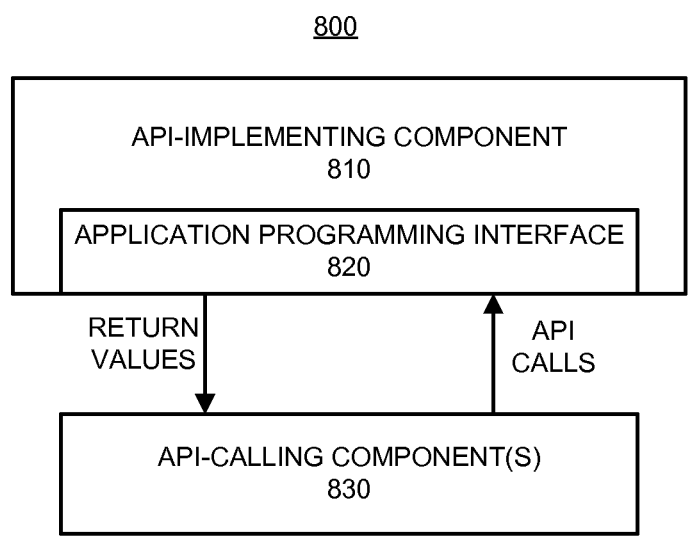
FIG. 8 illustrates how software components call each other through an API in accordance with the disclosed embodiments.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, or other module) makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and access the API-implementing component 810 using the API 820 over a network. While FIG. 8 illustrates a single API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

Figure 9:
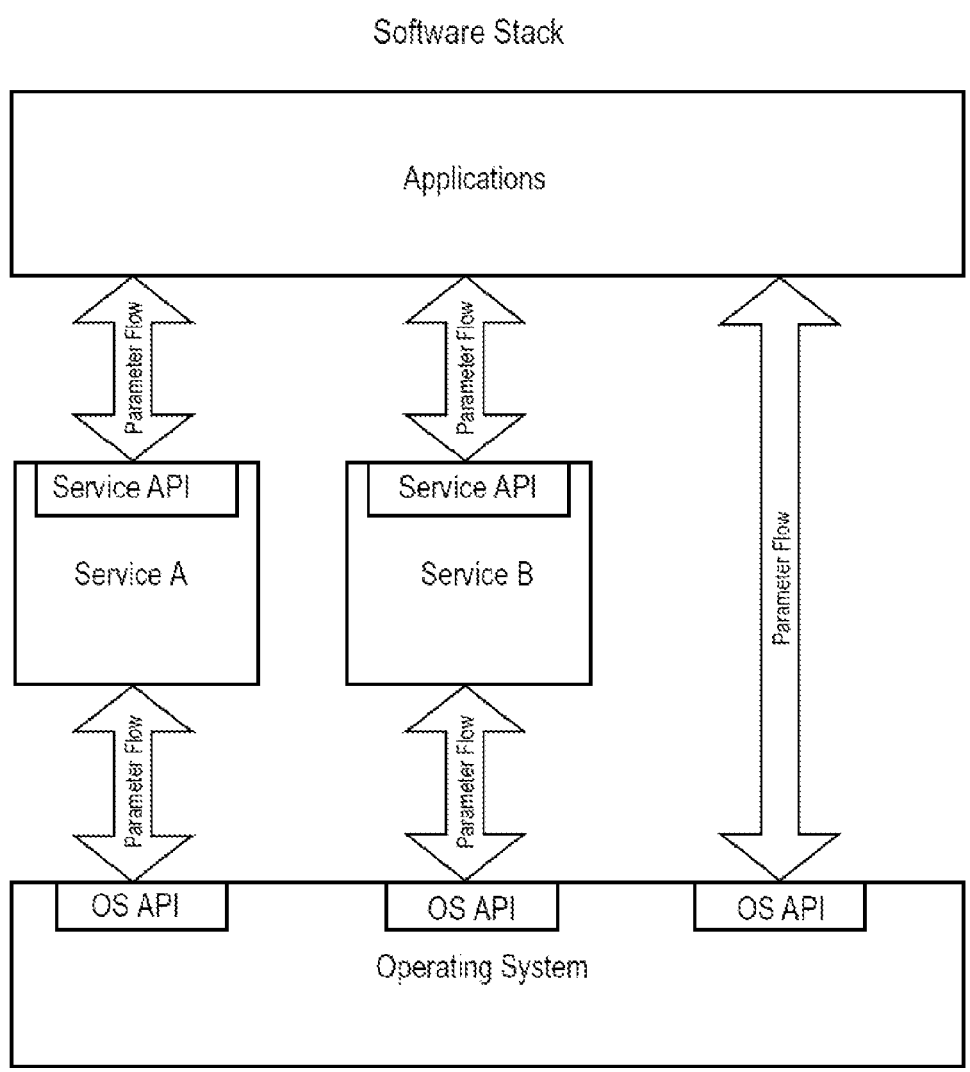
FIG. 9 illustrates how API calls can be made through a system stack in accordance with the disclosed embodiments.

In FIG. 9 ("Software Stack"), an exemplary embodiment, applications can make calls to Services A or B using Service API and to Operating System (OS) using OS API. Services A and B can make calls to OS using OS API.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A system that facilitates driverless printing, comprising:
a discovery component configured to identify accessible printers and to facilitate selection of an accessible printer wherein the discovery component is also configured to obtain capability information from the selected printer that includes identification of a preferred document format, from a plurality of document formats supported by the selected printer, and wherein the preferred document format comprises a format that is more efficiently printed by the selected printer than another of the selected printer's supported document formats;
a transport component configured to transport data to the selected printer; and
a page-description-language component configured to generate printer data for the selected printer in the preferred document format;
wherein the capability information obtained from the selected printer enables the system to generate the printer data for the selected printer without need for the system to maintain printer-specific software or printer-specific configuration information for the selected printer.

2. The system of claim 1, wherein the system provides an integrated framework that enables the discovery component, the transport component and the page-description-language component to be accessed by an application.

3. The system of claim 2, wherein the integrated framework includes one or more application programming interfaces (APIs) that provide access to the discovery component, the transport component and the page-description-language component.

4. The system of claim 1, wherein the capability information comprises current status information from at least some of the accessible printers.

5. The system of claim 4, wherein the current status information specifies one or more of the following: whether the printer is off-line, whether the printer is busy, and whether an error condition exists in the printer.

6. The system of claim 1, wherein the capability information for the printer specifies one or more of the following: resolutions, color spaces, bit depths, input slots, face-up/face-down input orientation, output bins, face-up/face-down output orientation, duplex printing support, media types, copy support, supported finishings, and print quality.

7. The system of claim 6, wherein the capability information for the printer additionally specifies one or more of the following: file sizes, file-format versions, and file-format extensions.

8. The system of claim 1, wherein the transport component is also configured to obtain the capability information from the selected printer.

9. A computing device that facilitates driverless printing, comprising:
a discovery component within the computing device configured to identify accessible printers and to facilitate selection of an accessible printer, wherein the discovery component is also configured to obtain capability information from the selected printer that includes identification of a preferred document format, from a plurality of document formats supported by the selected printer, and wherein the preferred document format comprises a format that is more efficiently printed by the selected printer than another of the selected printer's supported document formats;
a transport component within the computing device configured to transport data to the selected printer; and
a page-description-language component within the computing device configured to generate printer data for the selected printer in the preferred document format;
wherein the capability information obtained from the selected printer enables the computing device to generate the printer data for the selected printer without need for computing device to maintain printer-specific software or printer-specific configuration information for the selected printer.

10. The computing device of claim 9, wherein the capability information comprises current status information from at least some of the accessible printers.

11. The computing device of claim 9, wherein the transport component is also configured to obtain the capability information from the selected printer.

12. A method for facilitates driverless printing, comprising:
   using a discovery component to identify accessible printers and to facilitate selection of an accessible printer, wherein the discovery component is also configured to obtain capability information from the accessible printers that includes the capability information from the selected printer that specifies a preferred document format, wherein the preferred document format comprises a format that is more efficiently printed by the selected printer than another of the selected printer's supported document formats;
   using a transport component to transport data to the selected printer; and
   using a page-description-language component to generate printer data for the selected printer in the preferred document format;
   wherein the capability information obtained from the selected printer enables the method to generate the printer data for the selected printer without need for a computing device upon which the method operates to maintain printer-specific software or printer-specific configuration information for the selected printer.

13. The method of claim 12, wherein the discovery component, the transport component and the page-description-language component are accessed through a unified framework which can be accessed by an application.

14. The method of claim 13, wherein the unified framework includes one or more application programming interfaces (APIs) that provide access to the discovery component, the transport component and the page-description-language component.

15. The method of claim 12, wherein the capability information comprises current status information from at least some of the accessible printers.

16. The method of claim 15, wherein the current status information specifies one or more of the following: whether the printer is off-line, whether the printer is busy, and whether an error condition exists in the printer.

17. The method of claim 12, wherein the capability information for the printer specifies one or more of the following: resolutions, color spaces, bit depths, input slots, face-up/face-down input orientation, output bins, face-up/face-down output orientation, duplex printing support, media types, copy support, supported finishings, and print quality.

18. The method of claim 17, wherein the capability information for the printer additionally specifies one or more of the following: file sizes, file-format versions, and file-format extensions.

19. The method of claim 12, wherein the transport component is also configured to obtain the capability information from the selected printer.

20. A non-transitory computer-readable storage medium storing instructions thereon to cause the computer to:
   identify accessible printers and to facilitate selection of an accessible printer;
   obtain capability information from the accessible printer that includes identification of a preferred document format, from a plurality of document formats supported by the selected printer, and wherein the preferred document format comprises a format that is more efficiently printed by the selected printer than another of the selected printer's supported document formats;
   transport data to the selected printer; and
   generate printer data for the selected printer in the preferred document format;
   wherein the capability information obtained from the selected printer enables the computer to generate the printer data for the selected printer without need for the computer to maintain printer-specific software or printer-specific configuration information for the selected printer.

21. A machine-implemented method in an environment which uses an Application Programming Interface (API), the method comprising:
   transferring a discovery call through the API to cause a discovery component to identify accessible printers and to facilitate selection of an accessible printer, wherein the discovery component is also configured to obtain capability information from the selected printer that includes identification of a preferred document format, from a plurality of a plurality of document format supported by the selected printer, and wherein the preferred document format comprises a format that is more efficiently printed by the selected printer than another of the selected printer's plurality of supported document formats;
   transferring a transport call through the API to cause a transport component to transport data to the selected printer; and
   transferring a rendering call through the API to cause a page-description-language component to generate printer data for the selected printer in the preferred document format;
   wherein the capability information obtained from the selected printer enables the system to generate the printer data for the selected printer without need for the system to maintain printer-specific software or printer-specific configuration information for the selected printer.

22. The machine-implemented method of claim 21, wherein the capability information comprises current status information from at least some of the accessible printers.

23. A non-transitory program storage device comprising instructions stored thereon to cause one or more processors to:
   identify one or more accessible network printers;
   receive an indication that selects one of the one or more identified accessible network printers;
   obtain capability information from the selected printer that includes an indication of a preferred document format from a plurality of a plurality of document formats supported by the selected printer, wherein the preferred document format is more efficiently printed by the selected printer than another of the selected printer's plurality of supported document formats;
   generate printer data in the preferred document format for the selected printer; and
   send the generated printer data to the selected printer without the use of the printer-specific software or printer-specific configuration information for the selected printer.

24. The non-transitory program storage device of claim 23 wherein the instructions to cause one or more processors to identify, receive, obtain, generate and send are accessed through one or more Application Programming Interfaces (APIs).

* * * * *